(12) United States Patent
Wells et al.

(10) Patent No.: US 6,989,996 B2
(45) Date of Patent: Jan. 24, 2006

(54) CIRCUIT BREAKER PANEL FOR HAZARDOUS ENVIRONMENTS

(75) Inventors: Mark Tullis Wells, Edmonton (CA); Mark Peter Brodrick, Calgary (CA); Peter Francis Cahill, St. Albert (CA); Kenneth James Martin, Calgary (CA)

(73) Assignee: Brodwell Industrial Sales Ltd., Edmonton (CA)

( * ) Notice: Subject to any disclaimer, the term of this patent is extended or adjusted under 35 U.S.C. 154(b) by 0 days.

(21) Appl. No.: 10/406,743

(22) Filed: Apr. 3, 2003

(65) Prior Publication Data

US 2004/0196640 A1    Oct. 7, 2004

(51) Int. Cl.
*H05K 7/14* (2006.01)
(52) U.S. Cl. .................. 361/801; 200/50; 200/293
(58) Field of Classification Search ................ 361/752, 361/754, 800–802, 622, 641, 650–658; 200/50, 200/293, 296, 297; 335/202, 6
See application file for complete search history.

(56) References Cited

U.S. PATENT DOCUMENTS

| | | | | |
|---|---|---|---|---|
| 2,801,768 A | * | 8/1957 | Immel | 220/88.2 |
| 4,034,170 A | * | 7/1977 | Raabe et al. | 200/50.12 |
| 4,260,863 A | * | 4/1981 | Appleton | 218/1 |
| 4,783,718 A | * | 11/1988 | Raabe et al. | 361/652 |
| 4,965,414 A | * | 10/1990 | Sobotka et al. | 200/50.02 |
| 5,202,538 A | * | 4/1993 | Skirpan | 174/65 R |
| 5,286,935 A | | 2/1994 | Mina et al. | 200/330 |
| 5,341,273 A | * | 8/1994 | Sharp et al. | 361/641 |
| 5,393,942 A | * | 2/1995 | Reiner et al. | 200/50.4 |
| 5,410,446 A | * | 4/1995 | Wright et al. | 361/652 |
| 5,414,584 A | * | 5/1995 | Young | 361/115 |
| 5,577,603 A | * | 11/1996 | Bogdanovs et al. | 200/331 |
| 5,597,991 A | * | 1/1997 | Chen et al. | 200/50.02 |
| 5,634,553 A | * | 6/1997 | Hopper et al. | 200/336 |
| 6,031,193 A | * | 2/2000 | Flegel | 200/50.33 |
| 6,266,232 B1 | * | 7/2001 | Rose et al. | 361/645 |

OTHER PUBLICATIONS

Hubbell Killark Product Information Sheets DE12, DE13, DE17, DE18, DE19, DE20 and DE21, 7 pages, undated.
Cooper Crouse-Hinds product brochure, 12 pages, 2000.
A.T.X. Catalog 1998, "Electrical Equipment for Hazardous Areas", p. 42, 144, 146, 152, 153, 162, and 167.

* cited by examiner

*Primary Examiner*—Kamand Cuneo
*Assistant Examiner*—Thanh S. Phan
(74) *Attorney, Agent, or Firm*—Davis & Bujold, P.L.L.C.

(57) ABSTRACT

A circuit breaker panel for hazardous environments and, in particular, Class 1, Division 2 environments, includes a housing having an internal cavity and an access opening through which the internal cavity is accessed. A closure door covers the access opening of the housing. The closure door is held in a closed positioned solely by one or more one latches. This permits rapid access to be obtained to the internal cavity through the access opening. Electrical components are positioned within the internal cavity of the housing, some of the electrical components being circuit breakers. Each of the circuit breakers and all other arcing and sparking electrical component is enclosed in its own self contained explosion proof casing.

8 Claims, 4 Drawing Sheets

CIRCUIT BREAKER PANEL FOR HAZARDOUS ENVIRONMENTS

FIELD OF THE INVENTION

The present invention relates to a circuit breaker panel for hazardous environments and, more particularly, Class 1, Division 2 environments.

BACKGROUND OF THE INVENTION

In North America, hazardous environments fall into different categories. Class 1 Division 1 covers hazardous environments in which a hazard, such as an explosive gas, is continuously or frequently present. Class 1 Division 2 covers hazardous environments in which the hazard potentially can be, but is only rarely, present. An arbitrary threshold level has been established of less than 10 hours a year, which serves as the dividing line between Division 1 and Division 2.

In Division 1 environments, circuit breaker panels are used which have explosion proof housings made from cast aluminum with specific tolerances engineered to contain any explosion. A flange is provided around an access opening to the housing. A closure door is secured by dozens of bolts to the flange, in order to prevent the closure door from being blown off the housing by the explosion. The width of the flange is selected so that any hot gases escaping past the flange have cooled sufficiently to avoid igniting gases in the outside environment by the time they exit the housing. The weight of these explosion proof housings vary with their size, but in all cases they weigh hundreds of pounds and a support structure must be provided that can support such weight. In view of this approach North American Division 1 circuit breaker panels are expensive and cumbersome to access.

Europe has adopted similar categories to Division 1 and Division 2, which are termed "Zone 1" and "Zone 2". Their Zone 1 standards are more stringent. Each electrical component must have its own self contained explosion proof casing. These explosion proof electrical components are placed into carbon impregnated enclosures which can be grounded. They use multiple housings which are assembled in a modular fashion. The European Zone 1 circuit breaker panels are even more expensive than those used in North America. European Zone 2 installations use the same circuit breaker panels as are used for Zone 1.

In an effort to address the above described problems with expense and access, there has been a movement to use two panels in tandem in North American Division 2 environments. One panel has a housing which is not explosion proof and the other panel has an explosion proof housing. Only those circuit breakers and other electrical components which may cause arcing or sparking during the course of their operation, are placed into the explosion proof housing. Providing two housings reduces access problems, as only circuit breakers and other arcing and sparking electrical components must be isolated within the explosion proof housing. It does not, of course, reduce the size and space requirements as two housings are used.

Although using one explosion proof panel and one panel that is not explosion proof has reduced expense and access problems, the industry is still looking for a better approach to Division 2 circuit breaker panels.

SUMMARY OF THE INVENTION

What is required is an alternative circuit breaker panel for Division 2 hazardous environments.

According to the present invention there is provided an circuit breaker panel for hazardous environments and, in particular, Class 1, Division 2 environments. The circuit breaker panel includes a housing having an internal cavity and an access opening through which the internal cavity is accessed. A closure door covers the access opening of the housing. The closure door is held in a closed positioned solely by one or more latches. This permits rapid access to be obtained to the internal cavity through the access opening. Electrical components are positioned within the internal cavity of the housing, some of the electrical components being circuit breakers. Each of the circuit breakers and all other arcing and sparking electrical components are enclosed in its own self contained explosion proof casing.

The circuit breaker panel, as described above, meets the safety requirements for Class 1 Division 2, while dramatically reducing costs and enhancing ease of access. The housing is not explosion proof and, as such, is light weight. This makes the cost of manufacture less and also results in savings for the support structure required to mount the housing. The closure door can either be hinged and latched or can be made removable and latched. The use of latches dramatically enhances ease of access. There is no need to separate electrical components by placing circuit breakers and all other arcing and sparking components into an explosion proof housing and all other electrical components into a housing that is not explosion proof; as the circuit breakers and the arcing and sparking components are, themselves, explosion proof.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
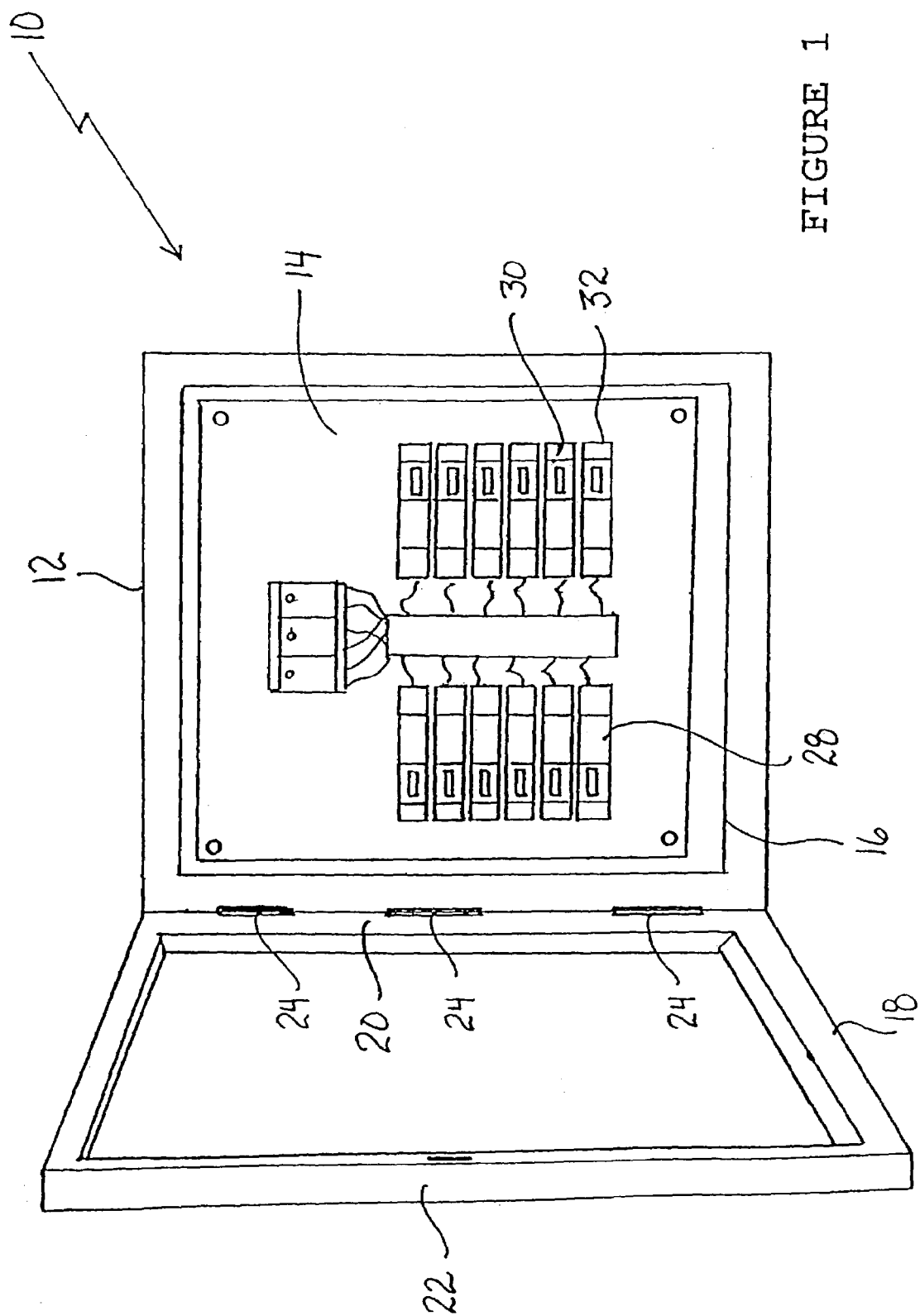
FIG. 1 is a perspective view of a circuit breaker panel for hazardous environments constructed in accordance with the teachings of the present invention.

The preferred embodiment, a circuit breaker panel for hazardous environments generally identified by reference numeral 10, will now be described with reference to FIGS. 1 through 4.

Figure 3:
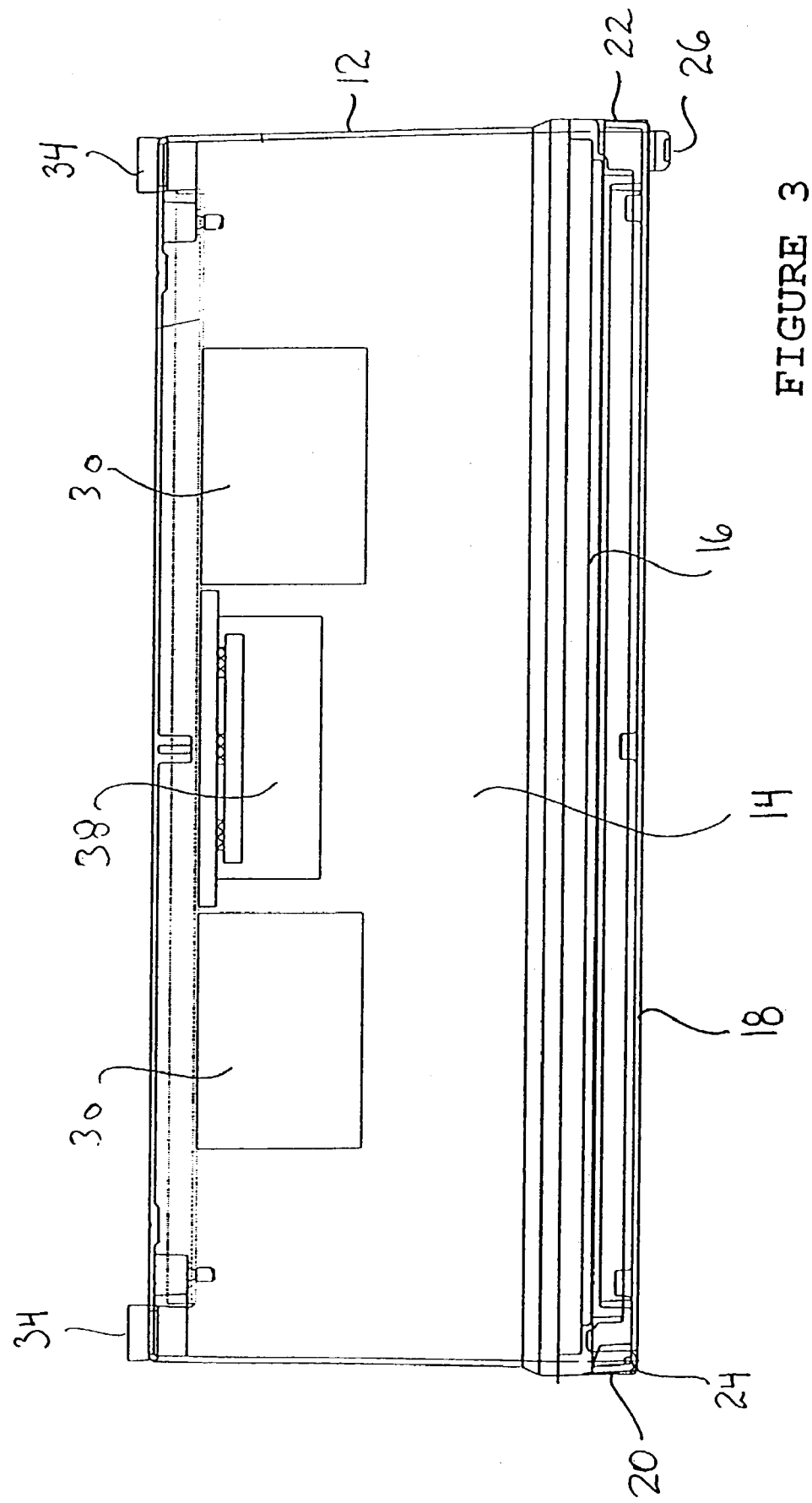
FIG. 3 is a top plan view of the circuit breaker panel illustrated in FIG. 1.

Structure and Relationship of Parts:

Referring to FIG. 1, there is provided a circuit breaker panel 10 that includes a rectangular housing 12. Housing 12 is preferably made from metal or fibreglass. Referring to FIG. 3, housing 12 has an internal cavity 14 and an access opening 16 through which internal cavity 14 is accessed. A closure door 18 covers access opening 16 of housing 12.

Referring to FIG. 1, closure door 18 has a first side edge 20 and a second side edge 22. Closure door 18 is pivotally mounted to housing 12 for pivotal movement between an open position and a closed position by hinges 24 that are positioned along first side edge 20.

Figure 2:
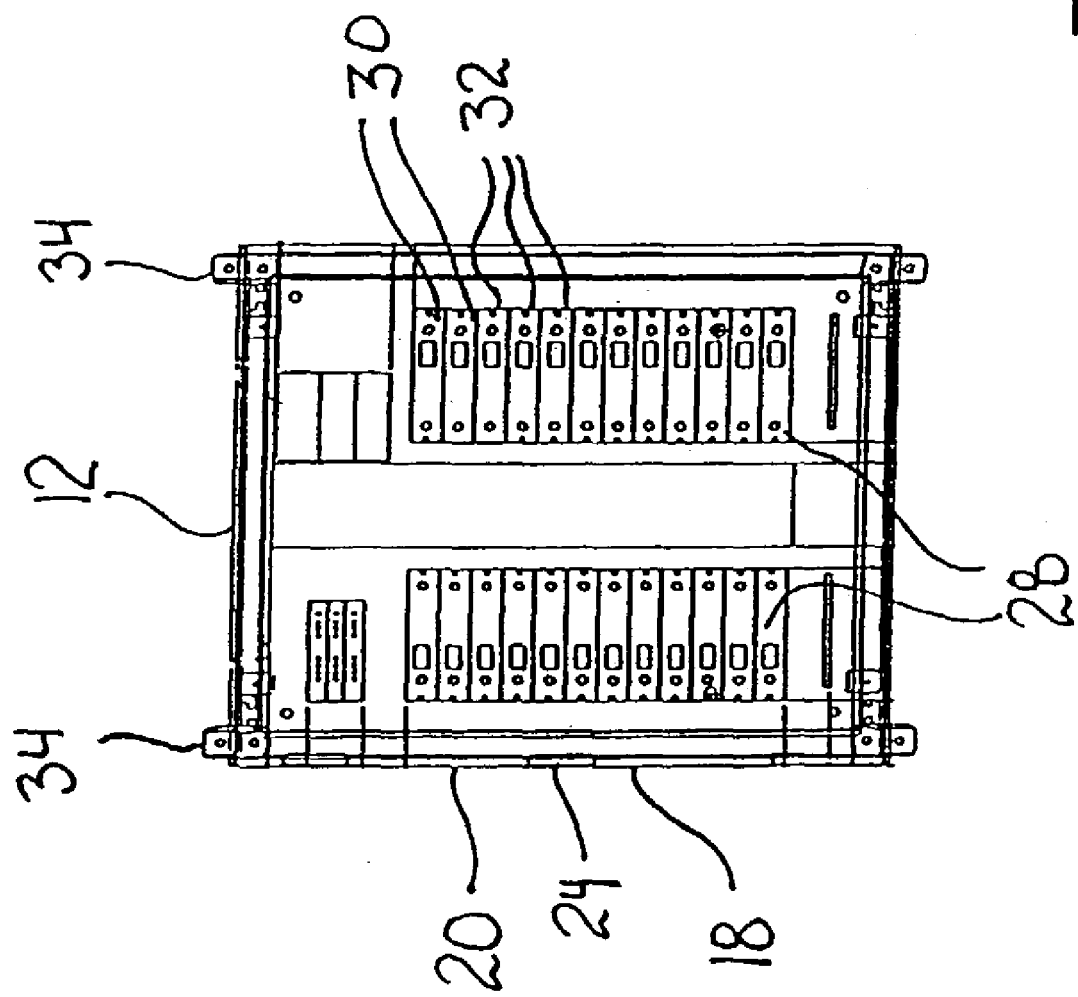
FIG. 2 is a front elevation view, in section, of the circuit breaker panel illustrated in FIG. 1.
Figure 4:
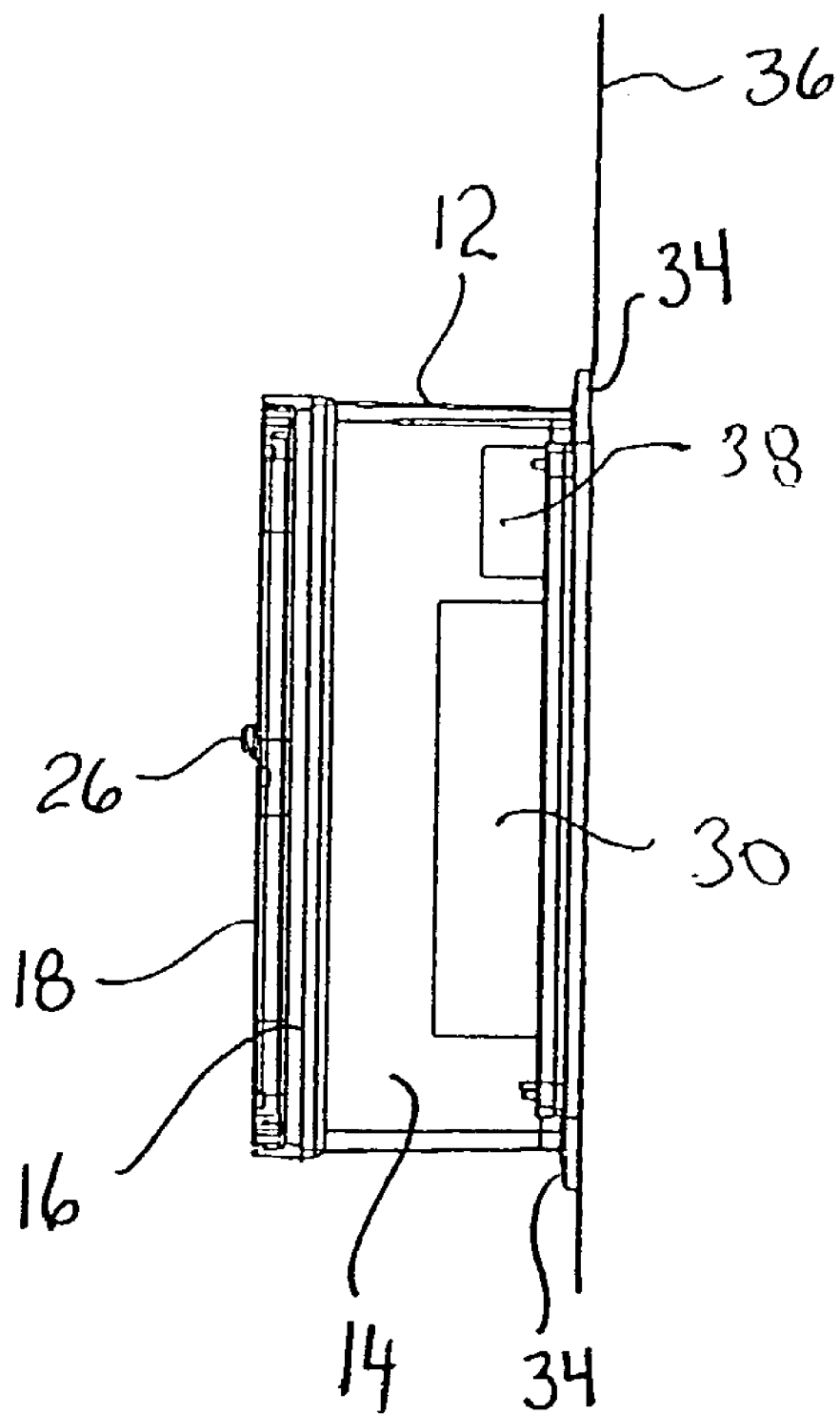
FIG. 4 is a side elevation view, in section, of the circuit breaker panel illustrated in FIG. 1.

Referring to FIG. 4, a latch 26 is positioned along second side edge 22. Closure door 18 is held in the closed positioned solely by latch 26, whereby rapid access is obtained to internal cavity 14 through access opening 16. Referring to FIG. 3, electrical components 28 are positioned within internal cavity 14 of housing 12. Referring to FIG. 2, some of electrical components 28 are circuit breakers 30. Each of the circuit breakers 30 and all other arcing and sparking electrical components is enclosed in its own self contained explosion proof casing 32. Referring to FIG. 3, a power distribution bus or block 38 is positioned between circuit breakers 30. Referring to FIG. 4, housing 12 has mounting tabs 34 for mounting circuit breaker panel 10 to a surface 36.

Operation:

The use and operation of circuit breaker panel for hazardous environments generally identified by reference numeral 10, will now be described with reference to FIGS. 1 through 4. Referring to FIG. 1, circuit breaker panel 10 is provided as described above. When access to electrical components 28 is required, closure door 18 is unlatched from housing 12, and pivoted to the open position. Electrical components 28, including circuit breakers 30 contained within housing 12 can then be accessed through access opening 16 of housing 12. When access is not required, closure door 18 is pivoted to the closed position, and latch 26 is activated to maintain closure door 18 in the closed position. In the event of an explosion within housing 12, an explosion within one of circuit breakers 30 will be contained within their own explosion proof casing 32 within housing 12.

Variations:

Instead of a latch, relatively rapid access may still be maintained by having four or six screws securing closure door 18 in the closed position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A circuit breaker panel for hazardous environments, comprising:
    a housing having an internal cavity and an access opening through which the internal cavity is accessed;
    a closure door covering the access opening of the housing, the closure door being held in a closed positioned by at least one and not more than six fasteners, whereby access is obtained to the internal cavity through the access opening by releasing the at least one and not more than 6 fasteners and opening the closure door; and
    a plurality of electrical components positioned in first and second spaced apart vertical stacks within the internal cavity of the housing, some of the electrical components being circuit breakers, each of the circuit breakers and all other arcing and sparking electrical components being enclosed in its own individual self contained class 1, division 2 explosion proof casing with only a circuit breaker switch projecting through a front face of the explosion proof casing substantially normal thereto so as to be accessible by an individual such that the circuit breaker switch of each self contained explosion proof casing is prevented from interfering with the close side by side abutting relationship of adjacent self contained explosion proof casings in the first and second spaced apart vertical stacks.

2. The circuit breaker panel as defined in claim 1, wherein the fasteners are screws.

3. The circuit breaker panel as defined in claim 1, wherein the fasteners include at least one latch.

4. The circuit breaker panel as defined in claim 3, wherein the closure door has a hinge along a first side edge, the closure door being mounted to the housing by the hinge for pivotal movement between an open position and the closed position, the at least one latch being positioned along a second side edge in order to maintain the closure door in the closed position.

5. The circuit breaker panel as defined in claim 1, wherein the housing is made from metal.

6. The circuit breaker panel as defined in claim 1, wherein the housing is made from fibreglass.

7. A circuit breaker panel for class 1, division 2 hazardous environments, comprising:
    a rectangular housing having an internal cavity and an access opening through which the internal cavity is accessed;
    a closure door covering the access opening of the housing, the closure door having a first side edge and a second side edge, the closure door being pivotally mounted to the housing for pivotal movement between an open position and a closed position by a hinge positioned along the first side edge;
    at least one latch positioned along the second side edge, the closure door being held in the closed position solely by at least one latch, whereby access is obtained to the internal cavity through the access opening by releasing the at least one latch and pivoting the closure door to the open position; and
    a plurality of electrical components positioned in one of first and second vertical stacks within the internal cavity of the housing, some of the electrical components being circuit breakers, with each of the circuit breakers and other arcing and sparking electrical components being enclosed within its own individual self contained class 1, division 2 explosion proof casing such that only a circuit breaker switch projecting through a front face of the explosion proof casing substantially normal thereto so as to be accessible by an individual thereby faciliating positioning of each self contained explosion proof casing, in the first and second vertical stacks, a close side by side abutting relationship with at least one other self contained explosion proof casing without the circuit breaker switch of any self contained explosion proof casing interfering with the close side by side abutting relationship of the self contained explosion proof casings.

8. A circuit breaker panel for class 1, division 2 hazardous environments, comprising:
    a rectangular housing having an internal cavity and an access opening through which the internal cavity is accessed;
    a closure door covering the access opening of the housing, the closure door having a first side edge and a second side edge, the closure door being pivotally mounted to the housing for pivotal movement between an open position and a closed position by a hinge positioned along the first side edge;

at least one latch positioned along the second side edge, the closure door being held in the closed position solely by at least one latch, whereby access is obtained to the internal cavity through the access opening by releasing the at least one latch and pivoting the closure door to the open position;

a plurality of electrical components, each one of the plurality of electric components being enclosed within an individual self contained class 1, division 2 explosion proof casing with only a circuit breaker switch projecting through a front face of the explosion proof casing substantially normal thereto so as to be accessible by an individual, each individual self contained explosion proof casing positioned in one of a first vertical stack and a second vertical stack within the internal cavity of the housing with each self contained explosion proof casing in the first and second vertical stacks being positioned in a close side by side abutting relationship with at least one other self contained explosion proof casing without the circuit breaker switch of any self contained explosion proof casing interfering with the close side by side abutting relationship of the self contained explosion proof casings, the plurality of electrical components being one or more of circuit breakers and power distribution blocks; and a distribution bus located between the first vertical stack and the second vertical stack.

* * * * *